United States Patent [19]

Ekdahl

[11] 4,251,279

[45] Feb. 17, 1981

[54] METHOD OF PRODUCING ALUMINA-CONTAINING FIBER AND COMPOSITION THEREFOR

[75] Inventor: Wendell G. Ekdahl, Larkspur, Colo.

[73] Assignee: Johns-Manville Corporation, Denver, Colo.

[21] Appl. No.: 17,508

[22] Filed: Mar. 5, 1979

[51] Int. Cl.³ .................... C03C 13/00; C04B 35/10
[52] U.S. Cl. .......................................... 106/50; 65/2;
106/39.5; 106/47 R; 106/52; 106/57; 106/59;
106/60; 106/61; 106/62; 106/63; 106/65;
106/66; 106/73.4; 106/DIG. 8; 65/2
[58] Field of Search ............... 106/50, 65, 73.4, 39.5,
106/47 R, 52, DIG. 8; 65/2; 423/111

[56] References Cited

U.S. PATENT DOCUMENTS

| | | | |
|---|---|---|---|
| 1,580,199 | 4/1926 | Hering | 65/2 |
| 2,710,261 | 6/1955 | McMullen | 106/50 |
| 2,873,197 | 2/1959 | McMullen | 106/50 |
| 3,240,560 | 3/1966 | Spear | 106/47 R |
| 3,310,412 | 3/1967 | Hofstadt et al. | 106/50 |
| 3,449,137 | 6/1969 | Ekdahl | 106/50 |
| 3,808,015 | 4/1974 | Seufert | 106/39.5 X |
| 3,812,055 | 5/1974 | Carstens et al. | 252/317 X |
| 3,853,688 | 12/1974 | D'Ambrosio | 106/65 |
| 3,859,427 | 1/1975 | Francis et al. | 106/65 |
| 4,055,434 | 10/1977 | Chen et al. | 106/50 |
| 4,094,690 | 6/1978 | Morton | 106/73.4 |
| 4,125,406 | 11/1978 | Sowman | 106/65 |

FOREIGN PATENT DOCUMENTS 1008883 5/1957 Fed. Rep. of Germany ............ 106/50

OTHER PUBLICATIONS

Gitzen, W. H.–Alumina as a Ceramic Material–Pub. by Am. Cer. Soc., Columbus, Ohio, (1970), pp. 17–19, 23–24, 26, 27, 30, 31, 64, 65, 67, 193–196.

*Primary Examiner*—Helen M. McCarthy
*Attorney, Agent, or Firm*—Robert M. Krone; Joseph J. Kelly; James W. McClain

[57] ABSTRACT

An improved process for the formation of alumina-containing fiber is described. The process utilizes alumina having an alpha crystalline phase content in the range of from 5% to 60%, preferably 5% to 35%, as compared to the alpha alumina contents of 75% to 90% of the prior art materials. Use of the low alpha crystalline phase content alumina permits substantial increase in the melt rate of the alumina-containing composition and thus increases production of fiber without any significant deterioration of other processing parameters or properties of the finished fiber.

21 Claims, No Drawings

METHOD OF PRODUCING ALUMINA-CONTAINING FIBER AND COMPOSITION THEREFOR

TECHNICAL FIELD

The invention herein relates to the production of inorganic fibers from oxide melts. More particularly it relates to the production of alumina-containing fibers from melts of alumina and other oxides.

BACKGROUND OF THE PRIOR ART

For some years inorganic fibers containing alumina have been manufactured by melting mixtures containing granular alumina (or kaolin) and other oxides such as silica, allowing the molten material to be blown by gas or steam or to impinge on rotors turning at high speed, and causing the resulting blown or spun fibers to be accumulated on a collecting surface. These fibers are then used in bulk or in the form of mats, blankets and the like as high temperature thermal insulation. The compositions from which the melts are formed may contain up to about 80% of alumina. Commonly the principal other oxide present is silica. In the "glass" fibers the silica will be the major component and the alumina will be present in relatively small amounts. In the "aluminosilicate" ("refractory") fibers the alumina and silica contents are of the same general magnitude (i.e., each in the range of about 40% to 60% of the total composition), and in the "high alumina" fibers the alumina is the predominant material, being up to about 80% of the composition. (Unless otherwise stated, all percentages herein are by weight.) All of these fiber types (especially the glass fibers) may contain other oxides in addition to silica. In the aluminosilicate fibers the other oxides which are preset in various fiber compositions include chromia (U.S. Pat. No. 3,449,137 to Ekdahl), calcium and magnesium oxides or dolomite (U.S. Pat. No. 4,055,434 to Chen and Pallo) or titania, iron oxide, soda, zirconia and/or boria (U.S. Pat. No. 2,710,261 to McMullen). The fiber products will normally have service temperatures in the range of from about 600° F. to 3200° F. (315° C. to 1760° C.) depending on the particular oxide composition from which the fibers are formed; glass fibers are used in the lower ranges (e.g., 600° F. to 1000° F.; 315° C. to 540° C.), aluminosilicate fibers in the middle ranges (e.g., 800° F. to 2700° F.; 425° C. to 1480' C.) and high alumina fibers in the higher ranges (e.g., 2300° F. to 3200° F.; 1260° C. to 1760° C.), although there is of course some overlap of service ranges and the exact limits of the range of each type of fiber are not absolute. Typical of commercial fibers are those refractory fibers sold under the trademarks "CERAWOOL," "CERAFIBER" and "CERACHROME" by Johns-Manville Corporation and also the glass fibers used by the same company in the manufacture of a wide variety of insulation products.

In the past, it was believed that in order to obtain sufficient refractoriness (i.e., ability to withstand appropriate service temperatures) of the fibers, it was necessary to use a highly calcined alumina as the alumina component in the melt from which the fibers are formed. Highly calcined aluminas have very high (usually 75% to 90%) contents of the alpha crystalline phase. These high alpha crystalline phase content aluminas have, however, has the disadvantage that they are quite slow melting. The production rate of fiber is therefore materially slowed because the formation rate of the melt is limited by the presence of the high alpha crystalline phase content alumina.

It would therefore be particularly desirable to have an oxide melt composition which would melt rapidly to allow increased fiber production rates while yet retaining the same desirable thermal properties of the fibers formed from such melt.

BRIEF SUMMARY OF THE INVENTION

The invention herein involves that high quality alumina-containing fibers can be formed at increased melt rates from a composition comprising 10% to 80% of an alumina component wherein the alumina component comprises an alumina containing 5% to 60%, preferably 5% to 35%, alpha crystalline phase with the remainder (i.e., 40% to 95%, preferably 65% to 95%) being at least one other crystalline alumina phase. Thus the invention comprises a process for the formation of alumina-containing fibers wherein the alumina component of the composition which is melted to form said fibers comprises alumina having an alpha crystalline phase content in the range of from 5% to 60%, preferably 5% to 35%, of the alumina with the balance (i.e., 40% to 95%, preferably 65% to 95%) being at least one other crystalline phase of alumina. In most cases the balance of the alumina will be a mixture of other alumina crystalline phases, rather than just a single phase.

The invention also comprises a composition useful for the formation of alumina-containing fibers which comprises an alumina component comprising alumima with an alpha crystalline phase content in the range of 5% to 60%, preferably 5% to 35%, with the balance (i.e., 40% to 95%, preferably 65% to 95%) being at least one other crystalline phase of alumina. In most cases the balance of the alumina will be a mixture of other alumina crystalline phases, rather than just a single phase. The composition may also contain any of the other oxides used in glass and refractory fiber compositions.

DETAILED DESCRIPTION OF THE INVENTION

The invention herein is an improved process for the formation of alumina-containing fibers from a molten composition and in which fiber production rates are substantially increased without any detrimental effect on the fiber product. The improvement is based on the surprising discovery that, contrary to the belief heretofore held by the industry, an alumina component having a low alpha crystalline phase content can be used in the composition and will not only produce fiber of satisfactory refractoriness but in addition will significantly increase the production rate of the fiber.

The "low alpha crystalline phase content alumina" used in the present invention is an essentially anhydrous material having the formula $Al_2O_3$. This alumina will be composed of a mixture of crystalline phases* of which the alpha phase will be present in the range of from 5% to 60%, preferably 5% to 35%, by weight of the total alumina. The remainder of this alumina (i.e., 40% to 95%, preferably 65% to 95%, by weight) will be composed of at least one other crystalline phase and usually will be composed of a mixture of a number of crystalline phases. Other anhydrous alumina crystalline phases which have been identified and which may be present in the alumina component of the present invention include those designated gamma, delta, eta, theta, iota, kappa and chi. The nature of the particular mixture of the non-alpha phases has not been found to be critical to the success of the present invention.

\* In some alumina nomenclature systems the term "form" is used instead of "phase." See, e.g., Gitzen, infra, p. 4. For the purposes of this invention the difference in terminology is not important.

The descriptions of the various alumina crystalline phases as well as a number of different methods for obtaining aluminas having the low alpha crystalline phase content are widely described in the prior art. In particular, Gitzen, *Alumina As A Ceramic Material (American Ceramic Society,* 1970) and Newsome et al., *Alumina Properties* (Technical Paper No. 10, 2d rev., Aluminum Company of America, 1960) contain detailed descriptions and also make reference to a large number of other research papers which also contain detailed descriptions of various aspects of crystalline phase formation and identification. Low alpha crystalline phase content aluminas of the type suitable in the present invention are available commercially under the designation "Lo-Alpha grade" from Kaiser Aluminum Company, "fusion grade" from Reynolds Metals Company and "metallurgical grade" from Aluminum Company of America.

In the present invention the alumina content of the composition from which fibers are to be formed will be in the range of from 10% to 80%. When the alumina content is below 10% (as with some types of glass fiber) the melt rate of the composition is not sufficiently dependent on the presence of the alumina in the composition to be materially effected by this invention. When the alumina content is greater than 80% it is not possible to form fibers by the melt processes described herein; such fibers can be formed in practice only by crystal growth techniques not applicable to the present invention.

In the present invention the low alpha crystalline phase content alumina is used in substantially the same manner as the prior art high alpha crystalline phase content aluminas. That is, it is used in the form of granules and in such form is mixed with similar granules of silica and optionally other oxides as described above to form the composition for melting. Typical particle size of the major portion of the granules is in the range of 45 to 150 micrometers. The exact particle sizes of the alumina are not critical, but it has been found that more efficient melting occurs when the particle sizes of all the oxides are of the same general order of magnitude. A wide variety of other inorganic oxides may be included with the alumina and silica. These include chromia, calcium oxide, magnesia, dolomite, zirconia, titania, boria, soda and/or iron oxide. The preferred oxides are described below in conjunction with the descriptions of the different intended services. This composition is then melted in a furnace (commonly an electric furnace) and the melt stream exiting from the furnace is fiberized in a conventional manner, as by rotor spinning, gas or steam blowing, etc.

Manufacture of glass fibers and typical glass fiber compositions will be found described in Tooley, *The Handbook of Glass Manufacture* (1974), especially Sections 1 and 12. A typical fiber glass composition there shown contains 54.5% silica, 14.5% alumina and the remainder various other oxides such as boria. A typical description of aluminosilicate fiber manufacture will be found in Kirk-Othmer, "Refractory Fibers," *Encyclopedia of Chemical Technology,* Vol. 17 (2d edn., 1968). The alumina, silica and other oxide contents commonly will be in the range of from 40% to 60% alumina, 40% to 60% silica and 0% to 20% of other oxides. Preferably the other oxides will be chromia in an amount of 0.5% to 10% of the composition (for higher temperature services), dolomite or a mixture of magnesia and calcium oxide in an amount of 3% to 16% of the composition (for lower temperature service) or zirconia in an amount of about 4% to 20% (for the alkali-resistant glass fibers). For mid-range service the aluminosilicate fibers will preferably have less than 1% other oxides. High alumina content fiber manufacture is substantially similar to aluminosilicate fiber manufacture. Modest variations in normal amounts of the alumina component (and therefore at least some of the other components) in each type of composition may be desirable to compensate for the presence of different quantities of combined and/or adsorbed water in the low alpha crystalline phase content aluminas as compared to the prior art high alpha crystalline phase content aluminas. The particular composition of the mixture chosen will be determined by the intended service temperature of the fiber product.

It is intended that the low alpha crystalline phase content alumina will be used as essentially a complete replacement for the prior art high alpha crystalline phase content alumina (or the kaolin used in some aluminosilicate or glass compositions) in both the composition and process of this invention, because with such complete substitution the maximum benefits will be obtained. The substantially complete (i.e., 100%) substitution is therefore the preferred form of the invention. However, it will be recognized that benefits, while reduced, will still be obtained by some partial replacement. For the purposes of this invention, however, benefits of practical significance will not be realized unless the low alpha crystalline phase alumina comprises at least 50% by weight of the total alumina component.

Compositions of the present invention using a commercial low alpha crystalline phase content alumina ("Lo-Alpha alumina" from Kaiser Aluminum Company) were tested in a continuously operated commercial size electric furnace. The "Lo-Alpha alumina" had an alpha crystalline phase content in the range of 16% to 30% by weight. The low alpha crystalline phase content alumina was substituted in total for conventional high alpha crystalline phase content alumina in a standard aluminosilicate composition containing approximately 54% silica, 45% alumina and 1% other oxides. For a control period of several days prior to the run with the low alpha crystalline phase alumina the average melt rate of the prior art oxide mixture was 733 lb/hr. During the 110 hour test period the average melt rate of the mixture including the low alpha crystalline phase content alumina was increased to 804 lb/hr. A subsequent control period of several days immediately following the 110 hour test period saw the average melt rate using conventional alumina reduced to 744 lb/hr. The average melt rate was thus increased during the test period by 8.9%. Other parameters of fiber production and the properties of the finished fiber were all found to be essentially equivalent to or slightly better than the properties of the fiber formed from the mixtures containing the conventional high alpha crystalline phase alumina.

The reasons for the improved performance of the low alpha crystalline phase content aluminas are not known with certainty, but it is believed that the lower grain density and larger surface area of these materials as compared to the conventional high alpha crystalline phase aluminas result in more rapid melting under equivalent temperature conditions. In this regard it has been noted that the conventional commercial high alpha crystalline phase content aluminas commonly have surface areas on the order of approximately 3 to 20 $m^2/g$ or less while the commercial low alpha crystalline phase content aluminas used in the present invention commonly have surface areas on the order of 40 to 100 $m^2/g$ or higher. The higher surface areas are believed to result in a "spongy" structure for the low alpha crystalline phase aluminas, which structure is much more amenable to melting.

STATEMENT OF INDUSTRIAL APPLICATION

The invention herein finds application in the field of inorganic fiber production. Inorganic fibers are commonly used as high temperature thermal insulations for devices such as furnaces, kilns and automotive catalytic converters.

I claim:

1. In a process for the production of alumina-containing fibers which comprises fiberizing a molten composition comprising an alumina component, the improvement wherein said alumina component has a surface area on the order of at least about 40 $m^2/g$ and comprises at least 50% by weight of essentially anhydrous alumina containing 5% to 60% by weight of alpha crystalline phase and 40% to 95% by weight of at least one other crystalline phase of alumina.

2. An improvement as in claim 1 wherein said alumina component consists essentially of said alumina containing 5% to 60% by weight of alpha crystalline phase and 40% to 95% by weight of at least one other crystalline phase of alumina.

3. An improvement as in claim 2 wherein the non-alpha crystalline phase portion of the alumina consists essentially of a mixture of non-alpha alumina crystalline phases.

4. An improvement as in claims 1, 2 or 3 wherein said alumina contains 5% to 35% by weight of alpha crystalline phase and 65% to 95% by weight of at least one other crystalline phase of alumina.

5. An improvement as in claims 1, 2 or 3 wherein the fibers to be formed are glass fibers.

6. An improvement as in claims 1, 2 or 3 wherein the fibers to be formed are high alumina fibers.

7. An improvement as in claims 1, 2 or 3 wherein the fibers to be formed are aluminosilicate fibers.

8. An improvement as in claim 7 wherein said composition comprises alumina and silica present as from 80% to 100% by weight of the composition and at least one other oxide present as from 0% to 20% by weight of the composition.

9. An improvement as in claim 8 wherein said at least one other oxide is chromia, calcium oxide, magnesia, dolomite, zirconia, titania, boria, iron oxide or soda.

10. In a composition useful for the production of inorganic fibers from a mixture of molten oxides, which composition comprises a mixture containing at least a silica component and an alumina component, the improvement which comprises:

(a) said alumina component having a surface area on the order of at least about 40 $m^2/g$ and being present in said composition in an amount in the range of from 10% to 80% by weight of said composition; and (b) said alumina component comprising at least 50% by weight thereof of essentially anhydrous alumina having an alpha crystalline phase content in the range of from 5% to 60% by weight and 40% to 95% by weight of at least one other crystalline phase of alumina.

11. An improvement as in claim 10 wherein said alumina component consists essentially of said alumina having 5% to 60% by weight of alpha crystalline phase and 40% to 95% by weight of at least one other crystalline phase of alumina.

12. An improvement as in claim 11 wherein the non-alpha crystalline phase portion of said alumina comprises a mixture of non-alpha alumina crystalline phases.

13. An improvement as in claims 10, 11 or 12 wherein said alumina contains 5% to 35% by weight of alpha crystalline phase and 65% to 95% by weight of at least one other crystalline phase of alumina.

14. An improvement as in claims 10, 11 or 12 wherein silica is the principal component and the fiber produced is a glass fiber.

15. An improvement as in claims 10, 11 or 12 wherein alumina is the principal component and the fiber produced is a high alumina fiber.

16. An improvement as in claims 10, 11 or 12 wherein the silica and alumina components are present in amounts of the same general magnitude and the fiber produced is an aluminosilicate fiber.

17. An improvement as in claim 16 wherein said silica and alumina components are present in a total of 80% to 100% by weight of the composition and at least one other oxide is present in a total of 0% to 20% of the composition.

18. An improvement as in claim 17 wherein said at least one other oxide is chromia, calcium oxide, magnesia, dolomite, zirconia, titania, boria, iron oxide or soda.

19. An improvement as in claim 18 wherein said at least one other oxide comprises chromia in an amount of from 0.5% to 10% by weight of the total composition.

20. An improvement as in claim 18 wherein said at least one other oxide comprises dolomite or calcium oxide and magnesium oxide in an amount of from 3% to 16% by weight of the total composition.

21. An improvement as in claim 18 wherein said at least one other oxide comprises zirconia in an amount of from 4% to 20% by weight of the total composition.

* * * * *